United States Patent [19]

Schneider

[11] Patent Number: 5,901,610
[45] Date of Patent: May 11, 1999

| [54] | ELECTROMOTIVE DRIVE MECHANISM FOR A PIECE OF FURNITURE |
|---|---|
| [75] | Inventor: Johannes Schneider, Kirchlengern, Germany |
| [73] | Assignee: Dewert Antriebs- und Systemtechnik GmbH & Co. KG, Kirchlengern, Germany |
| [21] | Appl. No.: 08/804,891 |
| [22] | Filed: Feb. 24, 1997 |
| [30] | Foreign Application Priority Data |

Mar. 8, 1996 [DE] Germany ............................ 296 04 293

[51] Int. Cl.⁶ ......................................................... F16H 1/12
[52] U.S. Cl. ........................... 74/421 A; 74/89.15; 74/410
[58] Field of Search .............................. 74/89.15, 421 A, 74/410, 458, 424.8 R

[56] References Cited

U.S. PATENT DOCUMENTS

| 4,114,468 | 9/1978 | Carpentier | 74/410 |
| 4,612,816 | 9/1986 | Chalik | 74/409 X |
| 4,635,491 | 1/1987 | Yamano et al. | 74/89.15 |
| 4,889,002 | 12/1989 | Abraham | 74/89.15 |
| 5,588,328 | 12/1996 | Nihei et al. | 74/421 A X |

*Primary Examiner*—Charles A. Marmor
*Assistant Examiner*—David Fenstermacher
*Attorney, Agent, or Firm*—Henry M. Feiereisen

[57] ABSTRACT

An electromotive drive mechanism for a piece of furniture, includes a gearmotor having a rotor rotating about a rotational axis, an adjusting spindle for operation of a piece of furniture, and a gear unit connecting the spindle to the rotor of the gearmotor for rotating the spindle about a rotational axis, with the rotational axis of the rotor extending parallel and at a distance to the rotational axis of the spindle. The gear unit includes a nut placed on the spindle for movement in longitudinal direction of the spindle when the spindle rotates, and a first pair of helical gears which are in mesh with one another for reducing the output speed of the gearmotor as transmitted to the spindle.

10 Claims, 4 Drawing Sheets

ELECTROMOTIVE DRIVE MECHANISM FOR A PIECE OF FURNITURE

BACKGROUND OF THE INVENTION

The present invention refers generally to an electromotive drive mechanism for a piece of furniture, and in particular to an electromotive drive mechanism of a type having a gearmotor in driving connection with a gearing having an output member for rotating an adjusting spindle and thereby moving a nut, disposed on the spindle, in longitudinal direction of the spindle.

Drives for furniture are utilized in a variety of application, e.g. for adjusting swingable parts of a slat frame bed for hospital beds, for treatment chairs, TV chairs or similar pieces of furniture. The furniture drive can be configured as single drive with one gearmotor and one adjusting spindle, or as twin drive with two gearmotors and two adjusting spindles. Conventionally, the gearing positioned between the gearmotor and the spindle is designed as worm drive, with the worm being mounted on the driven pin of the gearmotor for reducing the relatively great speed of the gearmotor, and with the wormgear being mounted on a shaft oriented at a right angle thereto and linked to the adjusting spindle. This type of electromotive drive is applicable only for smallest outputs with a power of a few 100 watts. The speed of the adjusting spindle should be relative small to enable a slow adjustment of the piece of furniture.

There is a desire to provide drives of this type of compact design to fit the limited space available in the piece of furniture for which these drive are used. While compact designs for furniture drives have been proposed, their dimensions are still too bulky. Moreover, efforts are made to keep the power being drawn as small as possible in order to reduce the energy consumption. This objective is however difficult to reconcile with the need to provide the furniture drive with a self-locking gear unit because the efficiency of conventional self-locking gear units is in the range of 0.5 so that the energy loss is respectively high.

SUMMARY OF THE INVENTION

It is an object of the present invention to provide an improved electromotive drive mechanism for pieces of furniture, obviating the afore-stated drawbacks.

In particular, it is an object of the present invention to provide an improved electromotive drive mechanism which is of simple design and exhibits smaller outer dimensions compared to conventional designs, and which is characterized by a reduced power consumption while yet maintaining a self-locking gear unit and still attaining a substantially enhanced efficiency.

These objects, and others which will become apparent hereinafter, are attained in accordance with the present invention by providing a gear unit for connecting a gearmotor, which has a rotor rotating about a rotational axis, to an adjusting spindle that is operatively connected to a piece of furniture and rotates about a rotational axis which extends parallel and at a distance to the rotational axis of the rotor, with the gear unit including a first pair of meshing helical gears for reducing the output speed of the gearmotor as transmitted to the spindle.

The outer dimensions of a drive mechanism according to the present invention are significantly reduced compared to conventional designs because the provision of axes that extend perpendicular to one another is omitted. The parallel disposition of the adjusting spindle relative to the rotational axis of the rotor could conceivably be effected by differently designed gear transmission, e.g. multistage spur gear unit, planetary gear train, or bevel gear unit; However, the multistage configuration does not permit a desired, compact configuration. Moreover, spur gear units are not self-locking so that their application for pieces of furniture is unsuitable. Moreover, the multistage configuration decreases the overall efficiency.

The use of a helical gear unit is possible for application with pieces of furniture because the output of an electromotive drive for furniture is relatively small, and has the advantage of not only effecting a desired speed reduction but also maintaining the parallelism between the rotational axes of the rotor and of the spindle. The helical gear unit attains a significantly greater efficiency than worm gears, e.g. in the range of approximately 0.8 to 0.9, and can be so configured as to effect a self-locking action so that the power consumption can be accordingly reduced. The self-locking action is of great efficiency while still allowing mutual compensation of axial forces. Thus, the use of separate brakes becomes unnecessary as is required in conventional drives which have parallel axes and shafts.

Preferably, the gear unit includes two pairs of meshing helical gears, with the first and second pairs of helical gears exhibiting a different nominal diameter whereby the helical gear of the first and second pairs of helical gears, positioned on an output end, is of a greater diameter than the helical gear of the first and second pairs of helical gears, positioned on an input end. The helical gear on the output end is always the gear downstream in force transmission direction. As the arrangement of two helical gears effects a compensation of axial forces, the configuration of the housing for the drive mechanism can be simplified.

A structurally simple solution for this type of gear unit is effected when securely mounting the helical gear of the first pair of helical gears on the input end and by securely mounting on an intermediate shaft the greater helical gear of the first pair of helical gears on the output end and the helical gear of the second pair of helical gears on the input end which meshes with the greater helical gear of the second pair of helical gears.

According to another embodiment of the present invention, the gear unit includes a first pair of helical gears and a second pair of meshing spur gears with straight or oblique teeth, whereby preferably oblique spur gears exhibit an addendum modification with a minimum number of teeth and a greatest possible transmission ratio. This embodiment is conditioned on the attained self-locking action, speed and required transmission ratio and is of simple construction because spur gears with straight or oblique teeth are commercially available components. Suitably, as viewed in transmission direction, the pair of spur gears is positioned ahead of the pair of helical gears.

The position of the gearmotor relative to the adjusting spindle can be best suited to existing installation conditions. It may be possible to position the gearmotor laterally next to the spindle or on the opposite side of the housing of the drive mechanism.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
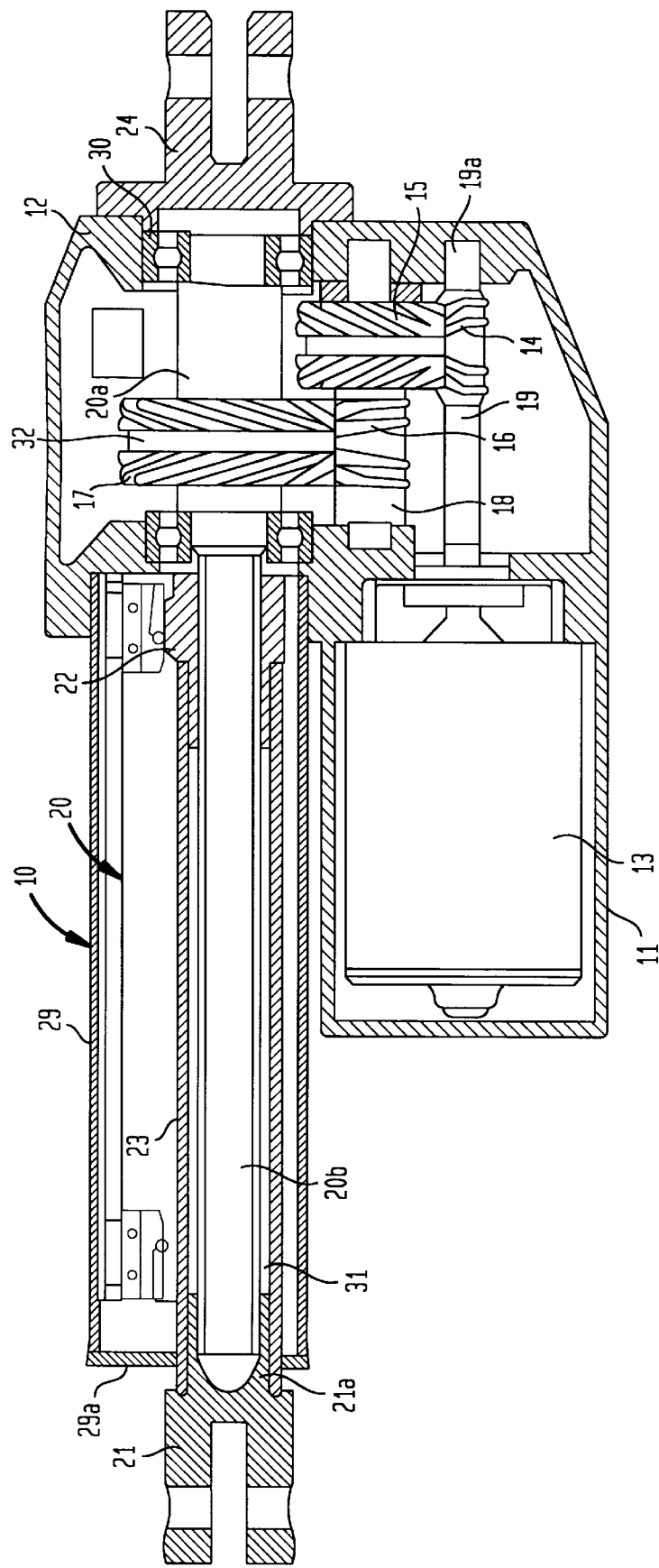
FIG. 1 is a sectional view of one embodiment of a drive mechanism for a piece of furniture, in accordance with the present invention.

Throughout all the Figures, the same or corresponding elements are always indicated by the same reference numerals.

Turning now to the drawing, and in particular to FIG. 1, there is shown a sectional view of one embodiment of a drive mechanism for a piece of furniture, in accordance with the present invention, generally designated by reference numeral 10. The drive mechanism 10 includes a multipart housing formed by a main body 12, a housing portion 11 which extends outwardly from the main body 12 and a housing portion 29 which projects outwardly from the main body 12 substantially parallel to the housing portion 11 at a distance thereto. The housing portion 11 accommodates a gearmotor 13 whose rotor (not shown) is linked to one end of an output shaft 19. Persons skilled in the art will appreciate that the gearmotor may be of any suitable type and thus is shown only schematically for sake of simplicity.

The other end of the output shaft 19 is formed as journal 19a which is rotatably supported by the main body 12. The main body 12 houses a gear unit which is composed of two pairs of helical gears 14, 15; 16, 17, with helical gear 14 securely mounted on the output shaft 19 for conjoint movement with the output shaft 19. The helical gear 14 is in mesh with the helical gear 15 and has a diameter which is smaller than the diameter of the helical gear 15. The helical gear 15 is securely mounted on an intermediate shaft 18 for conjoint movement therewith, with the intermediate shaft 18 being rotatably supported at both axial ends by the main body 12. The helical gear 16 is positioned laterally next to the helical gear 15 on the intermediate shaft 18 and has a diameter which is smaller than the diameter of the helical gear 15. In mesh with the helical gear 16 is the helical gear 17 which is securely mounted on one end 20a of an adjusting spindle, generally designated by reference numeral 20. The spindle end 20a is devoid of any thread and is rotatably supported via bearings 30 by the main body 12. Thus, the gear unit is of two-step configuration, with the helical gears 14 and 15 forming one pair of helical gears and the helical gears 16 and 17 forming the other pair of helical gears, thereby effecting a significant reduction of the speed of the gearmotor 13.

The plain spindle end 20a terminates in a threaded shank 20b. Mounted on the shank 20b is a nut 22 which is secured against execution of any rotational motion. Thus, at rotation of the spindle 20, the nut 22 travels in a linear movement along the shank 20b. The nut 22 is securely fixed to a lift-adjusting pipe 23 which moves conjointly with the nut 22. The lift-adjusting pipe 23 surrounds the spindle shank 20b at formation of a gap 31 therebetween and projects beyond the main body distant end face 29a of the housing portion 29.

The attachment of the drive mechanism 10 to and adjustment of a piece of furniture (not shown) effected via a fork head 21 which is secured to the nut-distal free end of the lift-adjusting pipe 23 by a fitting 21a that is formed with a socket to receive the proximal end of the spindle shank 20b and is press-fitted in the gap 31. Mounted to the end face of the main body 12, opposite to the fork head 21, is a further fork head 24 for enabling a secure attachment of the drive mechanism 10 to the respective piece of furniture.

It will be appreciated by persons skilled in the art that the drive mechanism 10 must contain much mechanical apparatus which does not appear in the foregoing Figure. For example, the drive is typically operated by a control system to allow adjustment of the piece of furniture to an intended position, or includes limit switches and other safety features such as manual switches, to prevent damage to the device or injury to the user in the event of improper operation or equipment malfunction. However, this apparatus, like much other necessary apparatus, is not part of the invention, and has been omitted from the Figure for sake of simplicity.

At operation, actuation of the gearmotor 13 transmits the speed outputted by the rotor onto the output shaft 19 and is reduced by the gear unit for transmission to the spindle 20. A rotation of the spindle 20 causes the nut 22 to travel in a linear direction along the spindle shank 20b. The movement of the nut 22 is directly transmitted onto the lift-adjusting pipe 23 and the fork head 21 to thereby adjust the position of the piece of furniture.

Figure 2:
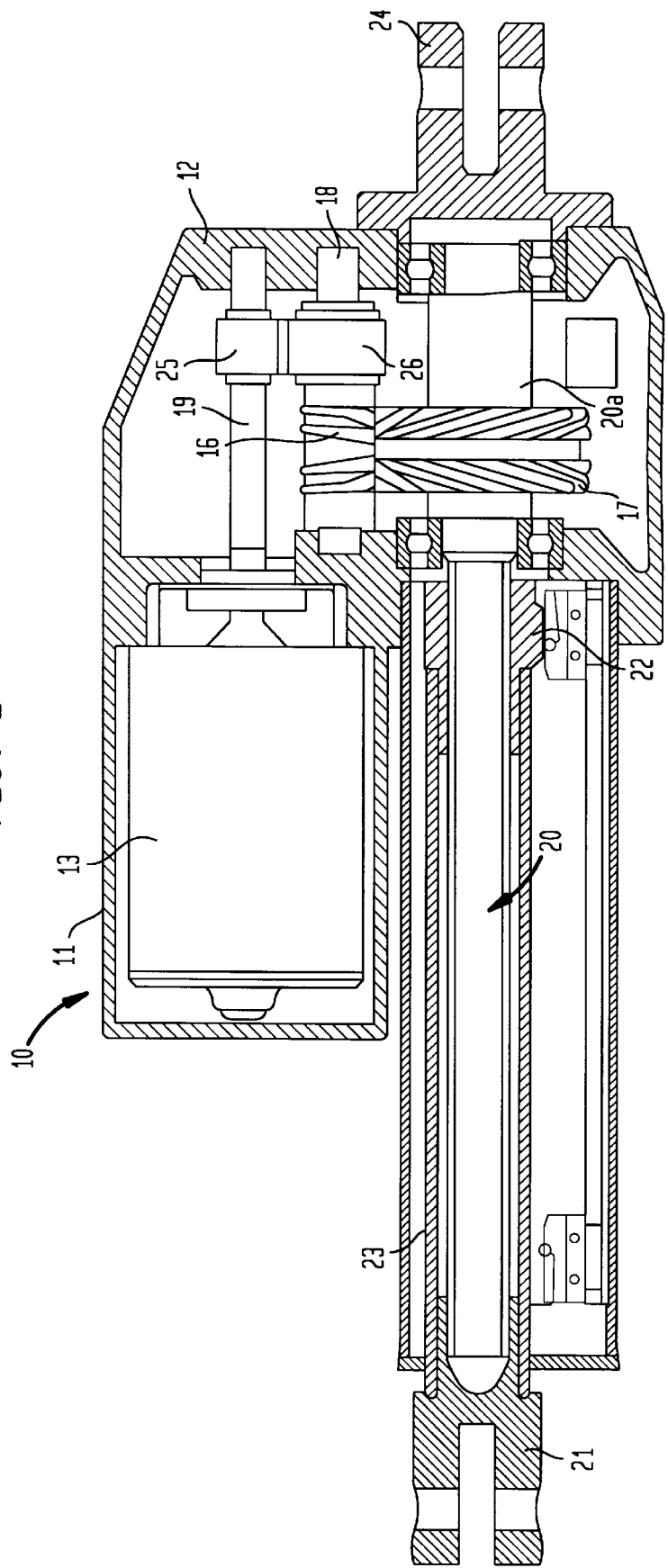
FIG. 2 is a sectional view of another embodiment of a drive mechanism for a piece of furniture, in accordance with the present invention.

Turning now to FIG. 2, there is shown a modification of the drive mechanism 10, with the difference to the embodiment shown in FIG. 1 residing in the positioning of the gearmotor 13 and the configuration of the gear unit. As in FIG. 1, the gearmotor 13 is positioned laterally next to the spindle 20 so that the rotational axis of the rotor of the gearmotor 13 extends parallel at a distance to the center rotational axis of the spindle 20. In accordance with the embodiment of FIG. 2, the motor housing 11 is positioned as a mirror image of the motor housing 11 of FIG. 1 so as to illustrate the feasibility of this type of installation.

The gear unit of the drive mechanism 10 of FIG. 2 includes one pair of spur gears 25, 26 and one pair of helical gears 16, 17, with spur gear 25 securely fitted on the output shaft 19 and meshing with the spur gear 26 of comparably greater diameter. The spur gear 26 is wedged onto the intermediate shaft 18 on which also the helical gear 16 is securely fitted. The helical gear 16 is in mesh with the greater helical gear 17 which is secured on the plain spindle end 20a. Although FIG. 2 shows the pair of spur gears 25, 26 as being positioned before the pair of helical gears 16, 17, as viewed in force transmission direction, the inverted disposition is certainly also possible.

In both embodiments, the helical gears 14, 15, 16, 17 are formed as twin helical gears with central radial groove 32. The teeth of the helical gears, positioned laterally on both sides of the radial groove 32 are slanted in opposite direction or exhibit an arrow-like configuration. In this manner, the gear unit runs smoothly and can be subjected to a relatively high load, whereby generated axial forces compensate each other.

Figure 3:
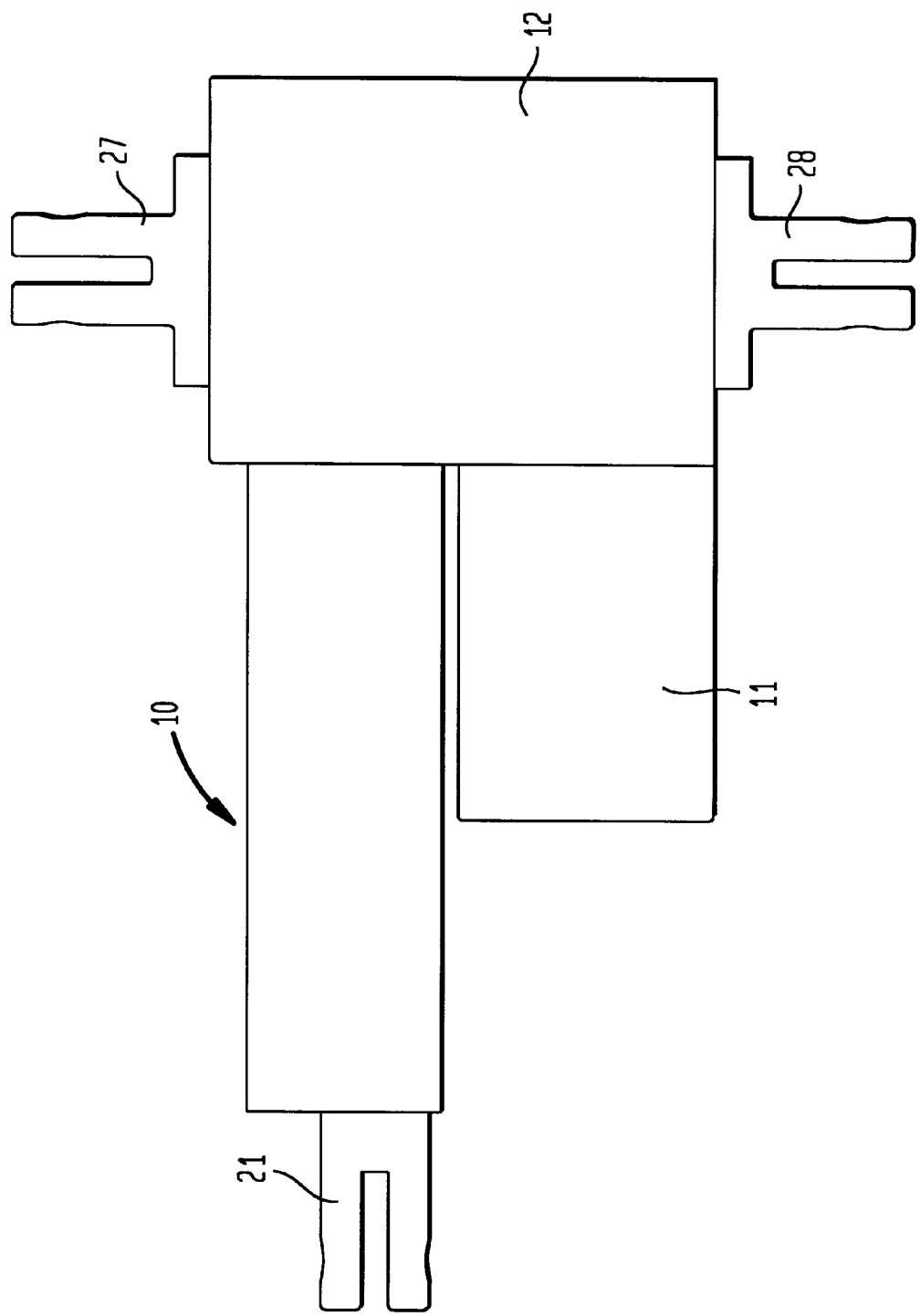
FIG. 3 is a schematic illustration of a variation of the drive mechanism of FIG. 1 with modified points of attachment of the drive mechanism to the piece of furniture.
Figure 4:
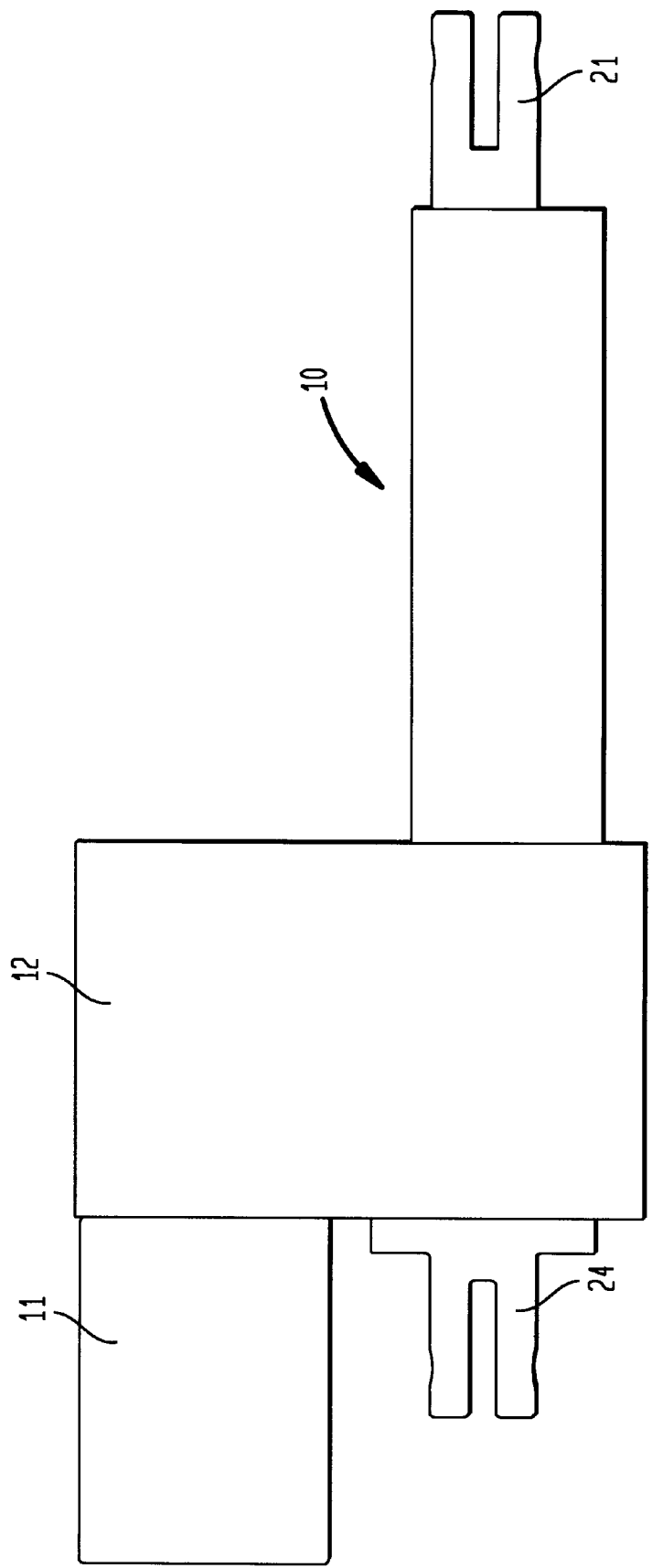
FIG. 4 is a schematic illustration of a variation of the drive mechanism of FIG. 2 with modified points of attachment of the drive mechanism to the piece of furniture.

FIGS. 3 and 4 show by way of example variations of positional dispositions of the motor housing 11 in relation to the adjusting spindle 20. In FIG. 3, the gearmotor 13 is again positioned laterally next to the spindle 20 in a manner shown in FIGS. 1 and 2. Mounted to both parallel and spaced outer end faces of the spindle 20 are further fork heads 27, 28 at a position transversely to the fork head 21 for provision of additional points of attachment of the drive mechanism 10 to the piece of furniture. Certainly, a mirror image disposition i.e. an arrangement turned by 180° is also possible.

FIG. 4 shows a variation of the drive mechanism 10 which is formed with axially opposing fork heads 21, 24 in a same manner as shown in FIGS. 1 and 2, with the difference residing in the positioning of the motor housing 11. In accordance with the embodiment of FIG. 4, the motor housing 11 is mounted to the main body 12 on the end face distant to the spindle 20. Also in this embodiment, the rotational axis of the rotor of the gearmotor 13 is oriented parallel and at a distance to the central longitudinal axis of the spindle 20, i.e. an offset disposition is effected between the rotor axis and the spindle axis.

The respective position of the motor housing 11 relative to the spindle 20 can be selected and suited to existing installation conditions and applications, so long as the central longitudinal axis of the spindle is offset to the rotational axis of the rotor of the gear motor 13.

While the invention has been illustrated and described as embodied in a electromotive drive mechanism for a piece of furniture, it is not intended to be limited to the details shown since various modifications and structural changes may be made without departing in any way from the spirit of the present invention.

What is claimed as new and desired to be protected by Letters Patent is set forth in the appended claims:

1. An electromotive drive mechanism for a piece of furniture, comprising:

a housing;

a gearmotor accommodated within the housing and having a rotor rotating about a first axis;

an adjusting spindle for operation of a piece of furniture; and a gear unit connecting the spindle to the rotor of the gearmotor for rotating the spindle about a second axis, with the first axis extending parallel and at a distance to the second axis, said gear unit including a nut placed on the spindle for movement in longitudinal direction of the spindle when the spindle rotates, and a first pair of helical gears in mesh with one another for reducing the output speed of the gearmotor as transmitted to the spindle, with one of the helical gears being operatively connected to the gearmotor and forming an input gear and the other one of the helical gears forming the output gear, wherein the helical gears have leads which are so selected as to effect a self-locking action when applying a rotational motion onto the output gear by compensating generated axial forces, said helical gears being formed as twin helical gears, each of the helical gears including a circumferential radial groove, with teeth arranged on both sides of the radial groove and extending in opposite direction.

2. The drive mechanism of claim 1 wherein the housing has a main body, said gearmotor being arranged in opposition to the main body.

3. The drive mechanism of claim 1 wherein the gear unit includes a second pair of meshing helical gears defining an input gear and an output gear, with the helical gears of the first and second pairs of helical gears exhibiting different nominal diameters, whereby the helical gear of the first and second pairs of helical gears forming the output gear has a greater diameter than the helical gear of the first and second pairs of helical gears forming the input gear.

4. The drive mechanism of claim 3 wherein the gear unit includes an output shaft linked to the rotor and an intermediate shaft, with the helical gear of the first pair of helical gears forming the input gear being securely mounted on the output shaft, and with the helical gear of the first pair of helical gears forming the output gear being securely mounted on the intermediate shaft and exhibiting a comparably greater diameter in relation to the helical gear forming the input gear, with the helical gear of the second pair of helical gears forming the input gear end being securely mounted on the intermediate shaft, and meshing with the helical gear of the second pair of helical gears forming the output gear of comparably greater diameter.

5. The drive mechanism of claim 1 wherein the gear unit includes a second pair of meshing gears, said second pair of meshing gears comprising spur gears.

6. The drive mechanism of claim 5 wherein the spur gears exhibit straight teeth.

7. The drive mechanism of claim 5 wherein the spur gears exhibit oblique teeth.

8. The drive mechanism of claim 5 wherein the spur gears are formed from profile-shifted spur gears with a minimum number of teeth.

9. The drive mechanism of claim 5 wherein the pair of spur gears is disposed in closer proximity to the gearmotor than the pair of helical gears.

10. The drive mechanism of claim 1 wherein the gearmotor is arranged laterally next to the adjusting spindle.

* * * * *